United States Patent Office 3,032,508
Patented May 1, 1962

3,032,508
PREPARATION OF AN AlCl₃-ETHER COMPLEX CATALYST
Bernard L. Evering, Chicago, Ill., and Alan K. Roebuck, Schererville, Ind., assignors to Standard Oil Company, Chicago, Ill., a corporation of Indiana
No Drawing. Filed Oct. 4, 1960, Ser. No. 60,296
7 Claims. (Cl. 252—429)

This is a continuation-in-part of our copending application, Serial No. 57,898, filed September 23, 1960.

This invention relates to catalysts of the aluminum chloride-ether complex type. More particularly, to catalysts wherein aluminum chloride is dissolved in an aluminum chloride-ether complex, which complex contains about equimolar amounts of aluminum chloride and ether. Also the invention relates to a method of preparing such catalysts of improved activity.

There has been known in the hydrocarbon conversion art the ability of complexes of aluminum chloride and ethers to function as a catalyst. Many ethers react with aluminum chloride to form catalytically active complexes. Particularly good catalysts of this type are combinations of dialkyl ethers and aluminum chloride. It is now known that these particular complexes require the presence of more than one mole of aluminum chloride per mole of ether and less than two moles of aluminum chloride per mole of ether to be an active catalyst. An equimolar combination of aluminum chloride and dialkyl ether is not in itself catalytically active.

It is now believed that the "complex" containing more than one mole of aluminum chloride per mole of ether is actually a solution of aluminum chloride in the equimolar complex. This dissolved aluminum chloride— now designated "free-AlCl₃"—is the active catalytic material. However, the ether complex and free-AlCl₃ solution forms the catalyst system utilized in hydrocarbon conversion processes such as paraffin alkylation, aromatic alkylation, paraffin isomerization, olefin polymerization, etc.

This AlCl₃-ether complex catalyst system is utilized with promoters as are other Friedel-Crafts catalysts. Also it is utilized with inhibitors to suppress a particular activity such as isomerization. U.S. Patent No. 2,897,248 describes in detail the utilization of this type of catalyst system alone and in combination with an aromatic inhibitor for paraffin alkylation. It is to be understood that the catalyst prepared by the method of the invention hereinafter to be described is suitable for use in the process such as described in this patent.

It has been observed that the catalyst system prepared by dissolving aluminum chloride into the equimolar aluminum chloride-ether complex is limited to about 6-7 weight percent of free-AlCl₃. Weight percent means that 6-7 parts by weight of aluminum chloride are dissolved in 100 parts by weight of equimolar ether complex. This solution is prepared without taking elaborate precautions to insure anhydrous nature of the aluminum chloride used and dry vessels and atmosphere during the solution formation.

It has been discovered that more than this 6-7 weight percent of free-AlCl₃ can be dissolved into aluminum chloride-dialkyl ether equimolar complex by having present during the solution formation added hydrogen chloride. The added hydrogen chloride should be present in an amount at least sufficient to effect a positive gaseous pressure of hydrogen chloride above the mixture of liquid complex and aluminum chloride particles being intermingled.

The activity of the catalyst system is favorably affected by the presence of aluminum chloride in excess of that "normal" 6-7 percent. Also in hydrocarbon conversion reactions particularly, the free-aluminum chloride reacts to form aluminum chloride-hydrocarbon complex which consumes aluminum chloride. The consumption of aluminum chloride in these undesired side reactions determines the catalyst activity maintenance; the more free-aluminum chloride present the longer the effective catalyst life. (This assumes that additional aluminum chloride is not being added to the catalyst system during the course of the conversion operation.) Thus, the introduction of any amount of aluminum chloride into solution in excess of the normal 6-7 weight percent is of value to this art. It is very easy to introduce on the order of 9 weight percent with the use of little added HCl. At ordinary temperatures, it is possible in a short stirring time of ether complex and aluminum chloride to obtain a catalyst system containing 12-13 weight percent of free-aluminum chloride, using HCl in an amount sufficient to produce a gaseous pressure of on the order of 25 pounds per square inch gauge. By increasing the contacting time as much as 15-18 weight percent of free-aluminum chloride may be introduced into the liquid complex.

The positive gaseous pressure of HCl which is present may be anywhere from a significant detectible amount to several hundred pounds gauge. In general, the method of the invention operates at HCl pressures from about 1 p.s.i.g. to about 250 p.s.i.g. More usually, the HCl pressure will range from about 10 p.s.i.g. to about 100 p.s.i.g. Very satisfactory results have been obtained at ordinary temperatures in glass equipment with HCl pressures of about 25 p.s.i.g.

The solution is prepared at any temperature at which the complex is a liquid ranging on up to temperatures approaching the decomposition point of the ether complex. In general, the temperature of solution formation will be from about 0° F. to about 200° F. In order to insure that the catalyst system is essentially saturated with respect to free-aluminum chloride at the temperature of operation, it is desirable to carry out the solution formation at about the temperature at which the catalyst system is to be used in a conversion process. It is pointed out that at ordinary temperatures on the order of 20° F. to 120° F. the saturation amount of free-aluminum chloride is relatively independent of temperature. Purely as a matter of convenience, it is usual to prepare the catalyst system at temperature on the order of 70-100° F.

The complex consists of aluminum chloride and dialkyl ether. It is preferred that the ether be a di-n-alkyl ether wherein each of the n-alkyl groups contains 1, 2, 3 or 4 carbon atoms. The particular n-alkyl groups are methyl, ethyl, n-propyl and n-butyl. Illustrative ethers are dimethyl ether, diethyl ether, methylethyl ether, di-n-propyl ether, methyl-n-propyl ether, and di-n-butyl ether. In low temperature operation, methylethyl ether or a physical mixture of dimethyl ether and diethyl ether have been found to be particularly useful. Another particularly suitable combination of ethers for use in low temperatures is the equilibrium mixture of diethyl ether, dimethyl ether and methylethyl ether from dehydration of an equimolar mixture of ethanol and methanol.

The catalyst system prepared by the method of the invention consists essentially of the hereinafter defined complex and at least 7 weight percent of dissolved aluminum chloride and preferably 9–15 percent of dissolved aluminum chloride.

ILLUSTRATION

The preparation of catalyst system is illustrated with a complex made up of aluminum chloride and an equimolar mixture of dimethyl ether and diethyl ether; this complex contains 1 mole of aluminum chloride and 1 mole of the ether mixture. The complex is introduced into a flask provided with a propeller agitator driven about 1800 r.p.m. Aluminum chloride in finely divided form was added to the flask containing the complex. Cylinder hydrogen chloride was pressured into the flask to 25 pounds gauge. At room temperature of 75° F. the partial pressure of the complex is negligible. Thus, the total pressure measured in the flask was gaseous pressure of HCl. The contents of the flask were agitated; the HCl pressure dropped and was brought back to 25 p.s.i.g. by adding more HCl. Usually the contents of the flask were agitated for about one hour. Then the HCl was vented and the flask was opened and the contents transferred to the reactor. The capacity of complex for dissolved $AlCl_3$ was determined by incremental additions of $AlCl_3$ to the flask. With prolonged agitation, it was possible to dissolve on the order of 15–18 weight percent of $AlCl_3$. (Analytical difficulties prevent more accurate determination of the saturation point.)

Tests were carried out in this manner at a temperature of 20° F. Solutions prepared by one hour of stirring had a dissolved aluminum chloride content of about 15 weight percent.

*In the absence of added HCl.*—Preparations were made of solutions in the absence of added HCl. No precautions were taken to eliminate adherent water from the flask or introduction of an inert atmosphere into the flask during the formation of the solution. Numerous preparations indicate that at temperatures on the order of 20° F.–75° F. "saturated" solutions would not exceed 6.9 weight percent of dissolved aluminum chloride at prolonged agitation; under ordinary agitation times these solutions contained about 6 weight percent of dissolved aluminum chloride.

*Dry conditions.*—After noting the favorable effect of added HCl on the amount of aluminum chloride going into solution some preparations were made taking elaborate precautions to avoid the introduction of moisture into the solution formation procedure. The equipment was dried as thoroughly as possible. A freshly opened container of "anhydrous" commercial aluminum chloride was used as the source of the finely divided $AlCl_3$. Dry inert gas was introduced into the flask to prevent entry of atmospheric moisture during the agitation. Under these dry conditions it appears that on the order of 3–4 weight percent of free-aluminum chloride can be introduced into the equimolar ether complex. Apparently the HCl formed by the presence of moisture under ordinary preparation conditions very nearly doubles the amount of aluminum chloride which can be taken into solution into the complex.

The utilization of the catalyst system prepared in the ordinary prior art fashion and of a catalyst system prepared by the method of this invention is demonstrated in the alkylation reaction of isobutane and butene-2.

The reaction vessel was a 1 liter autoclave provided with four vertical baffles positioned at the wall to improve agitation provided by a 2" propeller driven at 1800 r.p.m. by an electric motor. The reaction vessel was positioned in a bath which permitted maintaining the reactor at the desired temperature.

In each test, 15 ml. of the catalyst system was added to the reactor along with 650 ml. of isobutane: All of the isobutane was present in the reactor. After the contents of the reactor had been brought to temperature, butene-2 was added to the reactor at a rate of 2 ml. per minute. A total of 120 ml. of butene-2 was charged over a period of one hour. After all of the olefin was added, the agitation was continued for 3–5 minutes. It was observed that the olefin reacted with great rapidity and the additional contacting time after olefin addition was stopped was more or less precautionary rather than necessary.

The propeller was stopped and the contents of the reactor permitted to settle. A siphon tube was used to remove substantially all of the isobutane and alkylate: This material was drawn off into a Dry Ice cooled vessel. Dry Ice was used to solidify the liquid catalyst phase present in the reactor. The liquid hydrocarbon remaining in the reactor was then decanted from the solid catalyst phase and added to the first quantity of hydrocarbon removed.

The isobutane was removed from the alkylate in a stabilizing column. The total alkylate was water washed to remove catalyst phase and then dried over potassium carbonate. The dried alkylate was weighed to obtain the yield in the particular test. In all tests reported herein, the yield of alkylate is the weight of total alkylate based on the weight of butene-2 charged.

The dried total alkylate was distilled to remove an overhead fraction having an ASTM distillation end point of 350° F. The fraction boiling above 350° F. end point is termed "heavy ends." The CFR–R clear octane number of the alkylate overhead product was obtained.

Comparative tests were carried out at 50° F. In each of these tests hexaethylbenzene was introduced, 1 percent based on total hydrocarbons charged, to inhibit isomerization reactions and produce maximum octane number alkylate. (This procedure follows closely that described in the aforementioned U.S. Patent No. 2,897,248.)

*Test 1*

In this test, an effort was made to produce by the prior art procedure a catalyst system containing a maximum amount of free-aluminum chloride. This catalyst system contained 6.9 weight percent of dissolved aluminum chloride. The total yield of alkylate produced was 142 percent based on butene-2 charged. The octane number of the fraction boiling below 350° F. was 100.7 by the CFR–R method.

*Test 2*

In this test a catalyst system was prepared by the method of the invention and contained 13 weight percent of free-aluminum chloride. In the standard alkylation operation, the yield of total alkylate obtained was 188 percent. The octane number of the light alkylate was 100.4.

The above tests show that the catalyst prepared by the method of the invention produces light alkylate of insignificantly different octane number than the prior art catalyst and in a much greater amount owing to the 30 percent greater yield of alkylate obtained during the standard test procedure. The catalyst of the invention gave a yield of total alkylate closely approaching the 204 percent theoretical yield for these two reactants.

Thus having described the invention, what is claimed is:

1. A method of preparing an $AlCl_3$-ether complex catalyst which method comprises intermingling a liquid complex of aluminum chloride and dialkyl ether in equimolar amount, and aluminum chloride particles, said particles being present in an amount of at least 7 percent by weight of said complex, in the presence of added hydrogen chloride, in an amount sufficient to afford a positive gaseous pressure of HCl, for a time sufficient to form a catalyst consisting essentially of said complex and dissolved $AlCl_3$ in an amount of at least 7 weight percent based on complex, said catalyst containing more dissolved $AlCl_3$ than is possible to dissolve in the absence of said added HCl.

2. The method of claim 1 wherein said HCl pressure is from about 1 to about 250 p.s.i.g.

3. The method of claim 1 wherein said catalyst contains 9–15% of dissolved $AlCl_3$.

4. The method of claim 1 wherein said intermingling is at a temperature of 20°–120° F.

5. The method of claim 1 wherein ether is di-n-alkyl ether containing 1–4 carbon atoms in each alkyl group.

6. A catalyst produced by the method of claim 1.

7. A catalyst produced by the method of claim 5.

References Cited in the file of this patent

UNITED STATES PATENTS

| | | |
|---|---|---|
| 2,897,248 | Roebuck et al. | July 28, 1959 |
| 2,975,223 | Roebuck et al. | Mar. 14, 1961 |